Oct. 27, 1931.  J. SNEED  1,829,307
BRAKE ASSEMBLY
Original Filed July 24, 1928
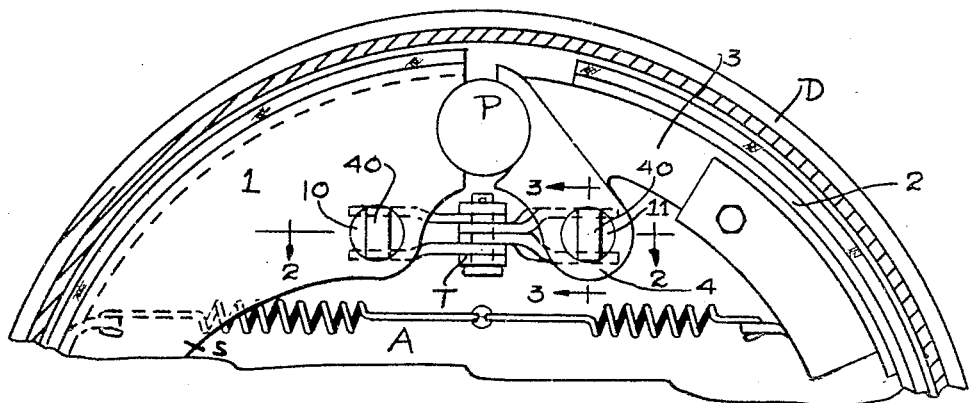
Fig.-1
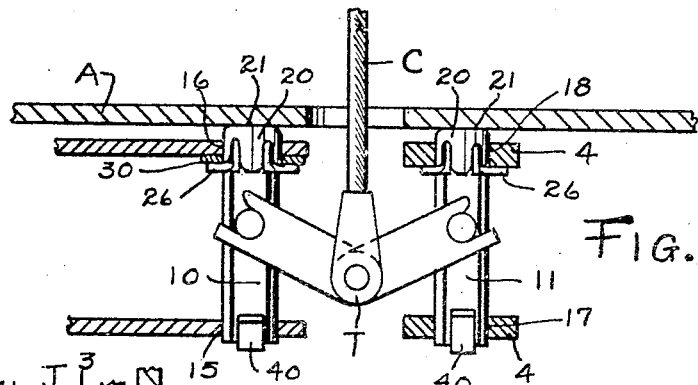
Fig.-2
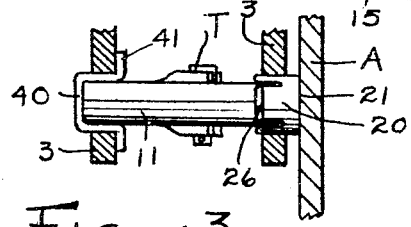
Fig.-3
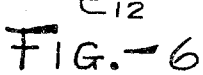
Fig.-6
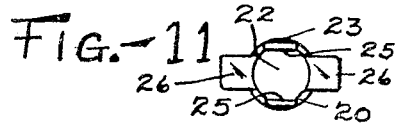
Fig.-10
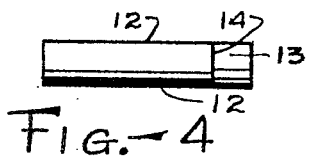
Fig.-4
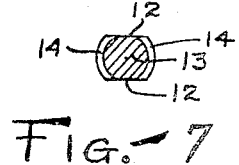
Fig.-7
Fig.-11
Fig.-8
Fig.-9
Fig.-5
Inventor
John Sneed
By Richey & Watts
Attorneys Patented Oct. 27, 1931

1,829,307

UNITED STATES PATENT OFFICE

JOHN SNEED, OF FERNDALE, MICHIGAN, ASSIGNOR TO THE MIDLAND STEEL PRODUCTS COMPANY, OF CLEVELAND, OHIO, A CORPORATION OF OHIO

BRAKE ASSEMBLY

Refiling of abandoned application Serial No. 295,011, filed July 24, 1928. This application filed November 5, 1929. Serial No. 405,023.

This invention relates to brakes and to the spreading mechanism therefor, and particularly to retainers and anti-friction means for the thrust pins of the spreading mechanism.

I choose to illustrate my invention in the environment of a well known brake which is of the internal expanding type and in which the ends of the shoe are spread apart by horizontally disposed toggle mechanism, the ends of which engage thrust pins which extend axially of the brake and are supported at their ends by spaced inwardly extending parts of the shoe assembly. In applying the brake the pivot point of the toggle is drawn toward the apron and the end of at least one of the thrust pins is necessarily drawn against the apron while moving and sliding along the apron with its end of the shoe. One of the objects of my invention is to provide anti-friction means between the ends of the pins and the apron to eliminate wear either of the pin or apron and reduce friction losses.

Another object is to provide a simple and inexpensive means for retaining the thrust pins in the ends of the shoe and in this respect reference may be had to my copending application Serial No. 286,154, filed June 18th, 1928, wherein I have illustrated and described one form of retaining means.

Another object is to standardize the parts including the thrust pins and retaining members so that they may be interchangeable from one shoe to another or from one brake to another. A further object is to arrange and design the parts so that the assembly may be rapid and efficient.

Other objects will appear from the following description of a preferred form of my invention, reference being had to the accompanying drawings. The essential characteristics are summarized in the claims.

In the drawings, Fig. 1 is a partial elevation of a shoe assembly including the spreading mechanism; Fig. 2 is a section taken along the line 2—2 of Fig. 1; Fig. 3 is a section taken along the line 3—3 of Fig. 1; Fig. 4 is a side elevation of a thrust pin; Fig. 5 is a top plan of the same; Figs. 6 and 7 are sections taken along the lines 6—6 and 7—7 respectively of Fig. 5; and Fig. 8 is a perspective of a retaining member prior to assembly; Fig. 9 is a perspective of the same member as deformed after assembly; Fig. 10 is a side view of one of the antifriction retaining members and Fig. 11 is a top plan view of the same member.

Referring to Fig. 1, I have illustrated the usual brake drum D, the open face of which is closed by an apron A. An anchor pin P is carried by the apron. A shoe S has adjacent ends engaging the anchor pin. One end 1 of the shoe may be pressed from sheet stock into a channel section and the other end 2 of the shoe may have a separate adjusting member 3 which has spaced depending ears 4 disposed in a complementary position with the side flanges of the channeled end of the shoe. A toggle T having its outer ends connected with the ends of the shoe serves to expand the shoe to actuate the brake.

Referring also to Fig. 2, I show a cable C extending through the apron and connected to the pivot point of the toggle by means of which the toggle is flattened. The cable may be drawn by manually operated means not shown. To afford a connection between the ends of the toggle and the ends of the shoe, thrust pins 10 and 11 are journalled in the ends of the shoe and disposed axially of the brake. The thrust pin 10 is journalled in the inwardly extending flanges of the channeled end of the shoe and the thrust pin 11 is jounalled in the depending ears 4 of the adjusting member 3.

Referring also to Figs. 4 and 7 inclusive, each of the pins may have flattened horizontal surfaces 12 upon which the ends of the toggle may bear. The pins may have reduced end portions 13 with shoulders 14 adjacent thereto. Referring back to Figs. 2 and 3, the side flanges of the channel have apertures 15 and 16 of equal size and the depending ears of the adjusting members have apertures 17 and 18 of equal size. I prefer that these apertures be equal so that they may be reamed with the same tool. The diameter of the apertures is preferably the same as the greatest diameter of the pins, and it is intended that at least one end of the pins be journalled directly in the apertures. In assembling the pins, the reduced end portions 13 are disposed toward the apron and the full end portions are journalled at least on their arcuate surfaces in the apertures 15 and 17 respectively.

Referring also to Figs. 10 and 11, I provide anti-friction retaining members 20 to overlie the reduced end portions 13 of the pins, and to exteriorly engage the inner walls of the apertures 16 and 18 respectively. The bottoms of these retaining members frictionally engage the inner face of the apron as at 21. I prefer that these members be made of bronze or like material and have their exterior surfaces impregnated with graphite in a well known manner. These retaining members 20 may be generally cup-shaped but comprise essentially disc like bottoms 22 with pairs of separate upstanding sides 23 and 24. The upstanding sides 23 may have flattened interior surfaces 25 which bear against the flattened surfaces 12 of the reduced ends of the pins. The upstanding sides 24 may have arcuate internal surfaces engaging the rounding surfaces of the reduced ends of the pins and the upstanding sides 24 may have outwardly flared ears 26, see also Figs. 2 and 3, which engage the inner faces of the flanges of the channel and the inner face of the one of the depending ears 4 of the adjusting member. The inner upper corners of the ears 26 may bear against the shoulders 14 of the pins. I prefer that the members 20 be of like size and shape and in instances where the side flanges of the channel part of the shoe are thinner than the ears 4 of the adjusting member, then such means as a washer 30 may be disposed between the ears 26 and the side flange of the channel to shim up the flange to the same thickness as the ear of the adjusting member.

It is to be noted that the depth of the cylindrical walls of the members 20 is greater than the thickness of the ears 4 of the side flanges of the channeled end of the shoe, so that the bases of the retaining members extend laterally beyond the sides of the shoe and serve as "steady-rests" to space the shoe ends from the apron.

The other ends of the pins are retained by U-shaped clips 40, see Figs. 8 and 9 which have spaced upstanding parts lying along the flattened surfaces of the pins and which have ears 41 which are turned back after the clips have been inserted. It will be appreciated that the load on these clips during the operation of the brake is not very great and that relatively pliable or ductile metal may be used.

In operation the spreading force exerted by either end of the toggle has a primary circumferential component and a lesser axial component, the pins of course move in their journals when the toggle is expanded and also move relative to the apron. The axial component with the spreading force is taken between the retaining members 20 and the apron, and the less the coefficient friction between these parts the more efficient the operation of the brake. As mentioned above the retaining members 20 may be impregnated with graphite so that friction between these members and the apron is reduced to a minimum. The circumferential component of the spreading force is taken through the cylindrical surface of the retaining members to the walls of the aperture in which the pins are journalled. The friction at this point is also reduced to a minimum to enhance the operation of the spreading mechanism.

From the foregoing it will appear that I have provided means which facilitate the assembly of the spreading mechanism; that serve to retain the thrust pins in the ends of the shoe; that reduce the friction losses which occur during the spreading of the ends of the brake shoe, and consequently increase the efficiency at which the brake may be operated and reduce the effort necessary to apply the brakes. While I have illustrated and described a preferred form of my invention, I do not care to be limited in the scope of my patent other than by the claims appended hereto.

I claim:

1. The combination of a brake shoe, a thrust pin journalled in the shoe, and an anti-friction bearing part disposed between the thrust pin and the shoe.

2. The combination of a brake shoe having inwardly extending radially spaced flanges, a thrust pin journalled at its ends in said flanges, and an anti-friction bearing part for at least one end of said thrust pin disposed between said pin and the flange in which the pin is journalled.

3. The combination of a brake shoe, an apron, a thrust pin journalled in the shoe and having an end extending toward the apron and a retaining member for the end of the pin overlying the end of the pin and engaging said apron to space the shoe away from the apron.

4. The combination of a brake shoe having inwardly extending radially spaced parts, an apron laterally adjacent the shoe, a thrust pin journalled at its ends in said parts, and an anti-friction bearing part for the end of said thrust pin adjacent the apron disposed between said pin and the flange in which the pin is journalled and having an anti-friction part contacting with said apron.

5. The combination of a brake shoe, an apron, a thrust pin journalled in the shoe and having an end extending toward the apron, and a retaining member overlying the end of the pin having an anti-friction surface contacting with said apron and spacing the shoe away from the apron.

6. In a brake the combination of a brake shoe, an apron, a toggle for actuating the shoe, means extending toward the apron and generally normal thereto for drawing the pivot point of the toggle toward the apron to expand the shoe, a thrust pin engaged by the toggle and carried by the end of the shoe and disposed generally normal to the apron, and a cup shaped member overlying the end of the pin and having an anti-friction exterior base surface slidably engaging the apron.

7. In a brake the combination of a brake shoe, an apron, a toggle for actuating the shoe, means extending toward the apron and generally normal thereto for drawing the pivot point of the toggle toward the apron to expand the shoe, a thrust pin engaged by the toggle and carried by the end of the shoe and disposed generally normal to the apron, and a separate wear member associated with the end of the thrust pin adjacent the apron for spacing the shoe from the apron.

8. The combination of a brake shoe having spaced aligned apertures, a thrust pin journalled in said apertures having flattened surfaces on opposite sides thereof, and retaining members for the ends of the thrust pins lying at least in part within said apertures, said retaining members having U-shaped portions the legs of which lie upon and engage the flattened surfaces of said thrust pins.

9. The combination of a brake shoe having spaced aligned apertures, a thrust pin journalled in said apertures having flattened surfaces on opposite sides thereof and a retaining member for one end of the thrust pins lying at least in part within one of said apertures, said retaining member having U-shaped portions the legs of which lie upon and engage the flattened surfaces of said thrust pin and having anti-friction exterior surfaces engaging the walls of said aperture.

10. In a brake, the combination of a brake shoe having spaced aligned circular openings, a thrust pin journalled in said openings, and retaining members for the ends of the pin having spaced parts extending through said openings and lying along opposite sides of said pin, the inner ends of said parts being flared outwardly at right angles to the pin.

11. In a brake, the combination of a shoe having inwardly extending radial side flanges having aligned circular openings therein, a thrust pin journalled in said openings and retaining members for the opposite ends of the pin having parts engaging the end faces of the pin and having parts extending through said opening and lying along the sides of said pin, the inner ends of said last named parts being flared outwardly at right angles to the pin and engaging the inner faces of said flanges.

12. The combination of a shoe having an inwardly extending part with a circular opening therein, a thrust pin journalled in said opening and having flattened surfaces at least at one end, a U-shaped clip extending over the end of the pin with its legs engaging the flattened surfaces thereof, the ends of the legs being turned outwardly after the parts are assembled to engage the side of said inwardly extending part and hold said pin within said opening.

13. A thrust pin retaining member having a disc-like base with separate upstanding side parts arranged in oppositely disposed pairs, at least one pair of said parts having outwardly turned ears extending parallel with the base and disposed remote therefrom.

14. The combination of a thrust pin having flattened surfaces on opposite sides and a retaining member for one end thereof having a base portion engaging the end face of the pin and having at least a pair of upstanding side parts having flat interior surfaces engaging the flattened surfaces of said pin whereby the member rotates with the pin.

15. The combination of a thrust pin having flattened top and bottom surfaces and a reduced end portion terminating in curved shoulders adjacent the body of the pin, and a separate member associated with the reduced end of the pin having a disc like base and pairs of upstanding side parts, one of said pairs of parts engaging the flattened sides of the pin and the other pair of parts having curved interior surfaces engaging the curved surfaces of the reduced end portion and having outwardly turned ears the bases of which engage said shoulders adjacent the body of the pin.

In testimony whereof I hereunto affix my signature this 2nd day of November, 1929.

JOHN SNEED.